United States Patent
Matsumura et al.

(10) Patent No.: US 12,192,810 B2
(45) Date of Patent: Jan. 7, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 360 days.

(21) Appl. No.: 17/754,337

(22) PCT Filed: Oct. 2, 2019

(86) PCT No.: PCT/JP2019/038999
§ 371 (c)(1),
(2) Date: Mar. 30, 2022

(87) PCT Pub. No.: WO2021/064919
PCT Pub. Date: Apr. 8, 2021

(65) Prior Publication Data
US 2022/0345918 A1    Oct. 27, 2022

(51) Int. Cl.
*H04W 24/08* (2009.01)
(52) U.S. Cl.
CPC .................. *H04W 24/08* (2013.01)
(58) Field of Classification Search
CPC .................................................. H04W 24/08
See application file for complete search history.

(56) References Cited

U.S. PATENT DOCUMENTS

2021/0022122 A1* 1/2021 Khoshnevisan ...... H04W 72/23

OTHER PUBLICATIONS

Office Action issued in the counterpart Japanese Patent Application No. 2021-550861, mailed on Nov. 28, 2023 (6 pages).
Qualcomm Incorporated; "Multi-TRP Enhancements"; 3GPP TSG-RAN WG1 Meeting #98, R1-1909272; Prague, Czech Republic; Aug. 26-30, 2019 (32 pages).
Huawei et al.; "Enhancements on Multi-TRP/panel transmission"; 3GPP TSG RAN WG1 Meeting #96bis, R1-1903970; Xi'an, China; Apr. 8-12, 2019 (20 pages).
Huawei et al.; "Enhancements on Multi-TRP/panel transmission"; 3GPP TSG RAN WG1 Meeting #98, R1-1908066; Prague, Czech Republic; Aug. 26-30, 2019 (23 pages).
Extended European Search Report issued in European Application No. 19947708.4, dated May 25, 2023 (10 pages).
(Continued)

*Primary Examiner* — Duc C Ho
(74) *Attorney, Agent, or Firm* — Osha Bergman Watanabe & Burton LLP

(57) ABSTRACT

A terminal according to an aspect of the present disclosure includes a control section that allocates a plurality of PDCCH candidates to at least one of a plurality of search space (SS) sets, based on maximum numbers of monitored physical downlink control channel (PDCCH) candidates and non-overlapped control channel elements (CCEs) per slot per transmission/reception point, and a receiving section that monitors the plurality of allocated PDCCH candidates, wherein each of the plurality of SS sets corresponds to any of a plurality of transmission/reception points. According to one aspect of the present disclosure, it is possible to appropriately monitor a downlink control channel.

5 Claims, 13 Drawing Sheets

(56) References Cited

OTHER PUBLICATIONS

3GPP TSG RAN WG1 98; R1-1909918 "Summary of agreements for NR_eMIMO up to RAN1#98" Samsung; Prague, Czech Republic; Aug. 26-30, 2019 (9 pages).
3GPP TSG RAN WG1 #93; R1-1806142 "Remaining details on search space" Nokia, Nokia Shanghai Bell; Busan, South Korea; May 21-25, 2018 (12 pages).
3GPP TSG RAN WG1 Meeting #95; R1-1813298 "Maintenance for NR mobility procedure" NTT DOCOMO, Inc.; Spokane, USA; Nov. 12-16, 2018 (12 pages).
3GPP TSG RAN WG1 Meeting #92bis; R1-1804551 "Remaining issues on search space" LG Electronics; Sanya, China; Apr. 16-20, 2018 (6 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2019/038999, mailed May 19, 2020 (4 pages).
Written Opinion issued in International Application No. PCT/JP2019/038999; Dated May 19, 2020 (3 pages).

\* cited by examiner

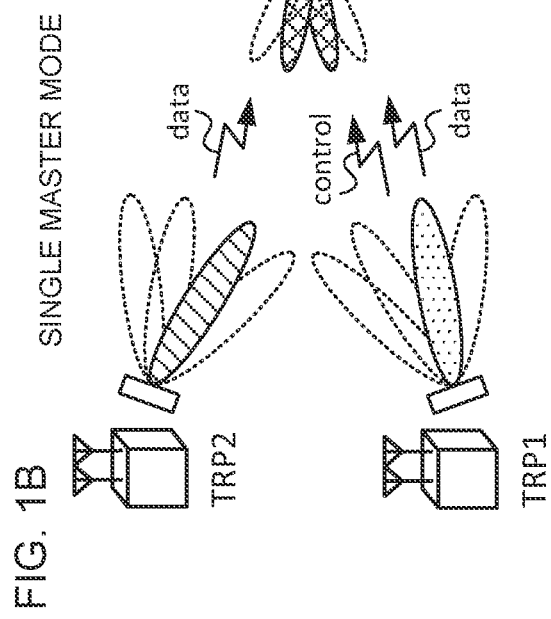
FIG. 1A SINGLE MODE
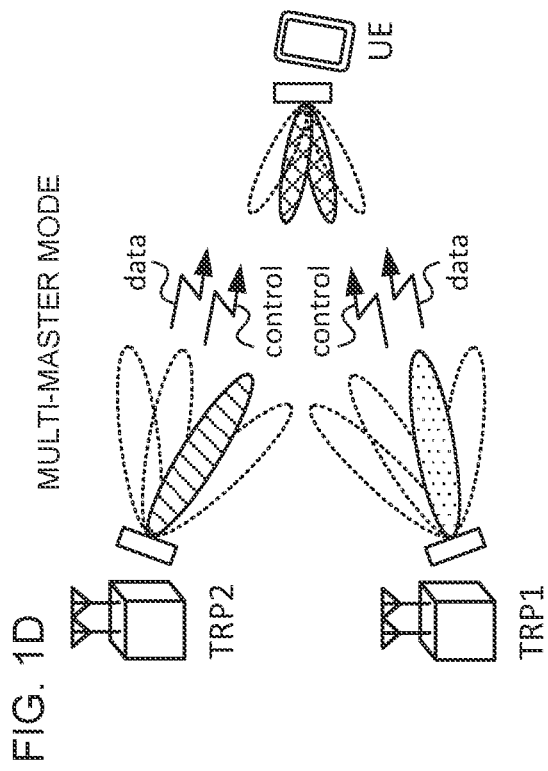
FIG. 1B SINGLE MASTER MODE
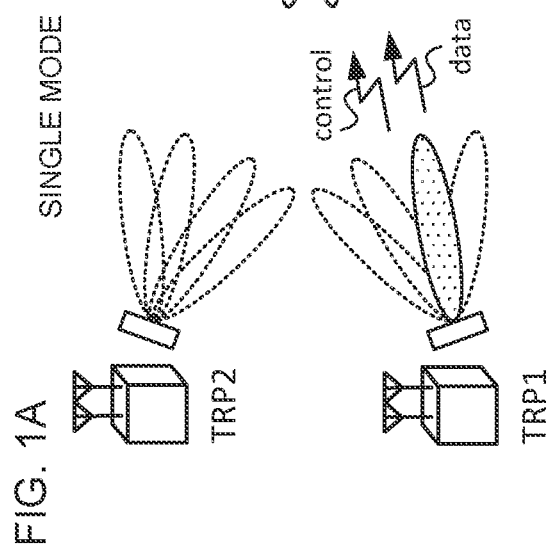
FIG. 1C MASTER SLAVE MODE
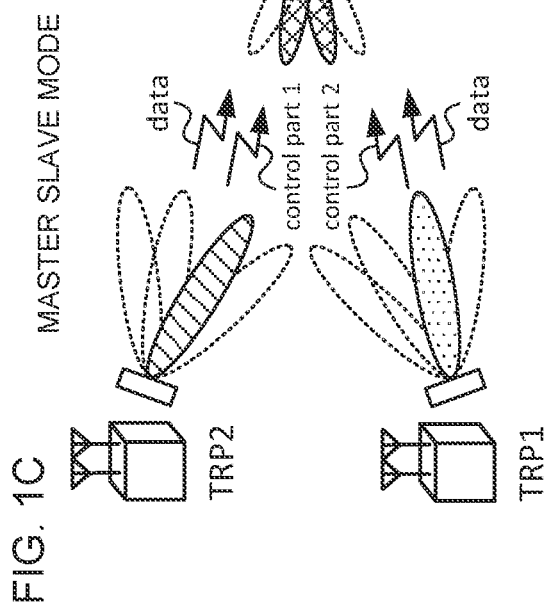
FIG. 1D MULTI-MASTER MODE

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

FIG. 2

| $\mu$ | Maximum number of non-overlapped CCEs per slot and per serving cell $C_{PDCCH}^{maxslot,\mu}$ |
|---|---|
| 0 | 56 |
| 1 | 56 |
| 2 | 48 |
| 3 | 32 |

FIG. 3

|  | CASE 0 | CASE 1 | CASE 2 | CASE 3 | CASE 4 | CASE 5 | CASE 6 | CASE 7 |
|---|---|---|---|---|---|---|---|---|
| TRP#1 | × | × | × | ● | × | ● | ● | ● |
| TRP#2 | × | × | ● | × | ● | × | ● | ● |
| RESTRICTION FOR NON-CA | × | ● | ● | ● | × | × | × | ● |
| MAPPING RULE 1/2/3 FOR CSS | NO OVER-BOOKING | IN CASE THAT NONE OF PDCCH CANDIDATES IN CSS SET IS MAPPED, CSS SET AND SUBSEQUENT SS SET ARE DROPPED. | | | | | | |

× : RESTRICTION PER TRP IS NOT MET OR RESTRICTION FOR NON-CA IS NOT MET
● : RESTRICTION PER TRP IS MET OR RESTRICTION FOR NON-CA IS MET

FIG. 5

|  | CASE 0 | CASE 1 | CASE 2 | CASE 3 | CASE 4 | CASE 5 | CASE 6 | CASE 7 |
|---|---|---|---|---|---|---|---|---|
| TRP#1 | × | × | × | ● | × | ● | ● | ● |
| TRP#2 | × | × | ● | × | ● | × | ● | ● |
| RESTRICTION FOR NON-CA | × | ● | ● | ● | × | × | × | ● |
| MAPPING RULE 1 FOR CSS | NO OVER-BOOKING | A | A | B | B | A | A | A |
| MAPPING RULE 2 FOR CSS | NO OVER-BOOKING | A | A | A | B | A | A | A |
| MAPPING RULE 3 FOR CSS | NO OVER-BOOKING | A | A | B | B | A | A | A |

×: RESTRICTION PER TRP IS NOT MET OR RESTRICTION FOR NON-CA IS NOT MET
●: RESTRICTION PER TRP IS MET OR RESTRICTION FOR NON-CA IS MET
A: CSS SET OF INTEREST AND SUBSEQUENT SS SETS ARE DROPPED
B: CSS SET OF INTEREST AND SUBSEQUENT SS SETS ASSOCIATED WITH TRP #2 ARE DROPPED

FIG. 6

| | CASE 0 | CASE 1 | CASE 2 | CASE 3 | CASE 4 | CASE 5 | CASE 6 | CASE 7 |
|---|---|---|---|---|---|---|---|---|
| TRP#1 | x | x | x | ● | x | ● | ● | ● |
| TRP#2 | x | x | ● | x | ● | x | ● | ● |
| RESTRICTION FOR NON-CA | x | ● | ● | ● | x | x | x | ● |
| MAPPING RULE 1/2/3 FOR USS | NO OVER-BOOKING | IN CASE THAT NONE OF PDCCH CANDIDATES IN SS SET IS MAPPED, SS SET AND SUBSEQUENT SS SETS ARE DROPPED | | | | | | | x : RESTRICTION PER TRP IS NOT MET OR RESTRICTION FOR NON-CA IS NOT MET
● : RESTRICTION PER TRP IS MET OR RESTRICTION FOR NON-CA IS MET

FIG. 8

|  | CASE 0 | CASE 1 | CASE 2 | CASE 3 | CASE 4 | CASE 5 | CASE 6 | CASE 7 |
|---|---|---|---|---|---|---|---|---|
| TRP#1 | × | × | × | ● | × | ● | ● | ● |
| TRP#2 | × | × | ● | × | ● | × | ● | ● |
| RESTRICTION FOR NON-CA | × | ● | ● | ● | × | × | × | ● |
| MAPPING RULE 1 FOR USS | NO OVER-BOOKING | A | A | B | B | A | A | A |
| MAPPING RULE 2 FOR USS | NO OVER-BOOKING | A | A | A | B | A | A | A |
| MAPPING RULE 3 FOR USS | NO OVER-BOOKING | A | A | B | B | A | A | A |

×: RESTRICTION PER TRP IS NOT MET OR RESTRICTION FOR NON-CA IS NOT MET
●: RESTRICTION PER TRP IS MET OR RESTRICTION FOR NON-CA IS MET
A: SS SET OF INTEREST AND SUBSEQUENT SS SETS ARE DROPPED
B: SS SET OF INTEREST AND SUBSEQUENT SS SETS ASSOCIATED WITH TRP #2 ARE DROPPED

FIG. 9

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For Rel. 16 NR, it is studied that one or more transmission/reception points (TRP) (multi-TRP) use one or more panels (multi-panel) to perform DL transmission to a terminal (user terminal, User Equipment (UE)).

How the UE monitors a downlink control channel from the multi-TRP is not clear. Unless this behavior is clear, increase in communication throughput may be suppressed.

As such, an object of the present disclosure is to provide a terminal and a radio communication method that can appropriately monitor a downlink control channel.

Solution to Problem

A terminal according to an aspect of the present disclosure includes a control section that allocates a plurality of PDCCH candidates to at least one of a plurality of search space (SS) sets, based on maximum numbers of monitored physical downlink control channel (PDCCH) candidates and non-overlapped control channel elements (CCEs) per slot per transmission/reception point, and a receiving section that monitors the plurality of allocated PDCCH candidates, wherein each of the plurality of SS sets corresponds to any of a plurality of transmission/reception points.

Advantageous Effects of Invention

According to one aspect of the present disclosure, it is possible to appropriately monitor a downlink control channel.

BRIEF DESCRIPTION OF DRAWINGS

FIGS. 1A to 1D are diagrams to show examples of a multi-TRP scenario;

FIG. 2 is a diagram to show an example of a maximum number of monitored PDCCH candidates;

FIG. 3 is a diagram show an example of the maximum number of non-overlapped CCEs;

FIG. 5 is a diagram to show an example of a dropping rule 1 for CSS;

FIG. 6 is a diagram to show an example of a dropping rule 2 for CSS;

FIG. 8 is, a diagram to show an example of a dropping rule 1;

FIG. 9 is a diagram to show an example of a dropping rule 2;

DESCRIPTION OF EMBODIMENTS (Multi-TRP)

Figure 4:
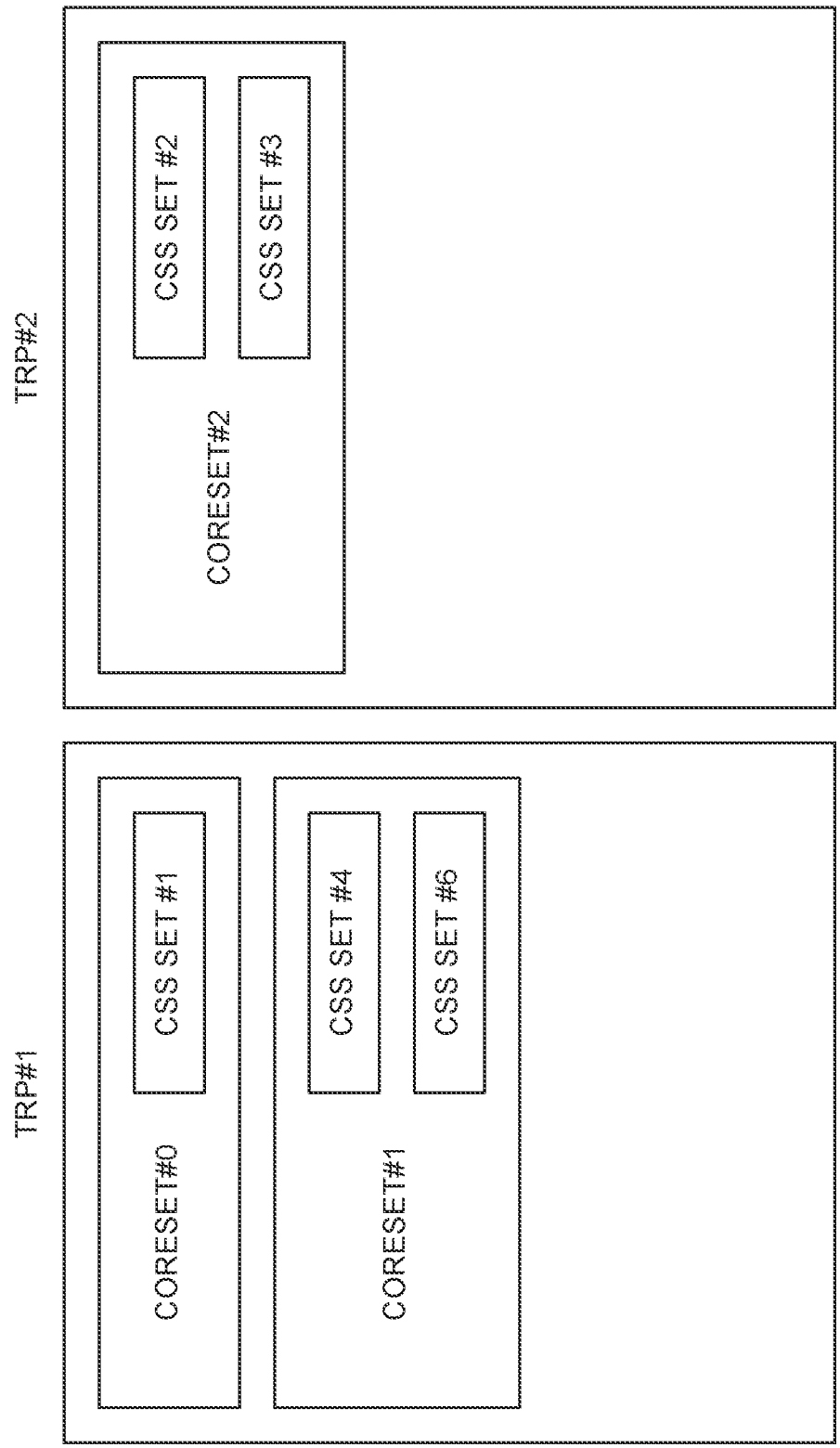
FIG. 4 is a diagram to show an example of a CSS set configuration.

For NR, it is studied that one or more transmission/reception points (TRPs) (multi-TRP) use one or more panels (multi-panel) to perform. DL transmission to a UE. It is also studied that the UE performs UL transmission to one or more TRPs.

Note that the plurality of TRPs may correspond to the same cell identifier (ID)), or to difference cell IDs. The cell ID may be a physical cell ID, or a virtual cell ID.

FIGS. 1A to 1D are diagrams to show examples of a multi-TRP scenario. In these examples, assume that each TRP can transmit four different beams, but the embodiment is not limited to these examples.

FIG. 1A shows an example of a case that only one TRP (a TRP 1 in this example) of the multi-TRP performs transmission to the UE (which may be referred to as a single mode, a single TRP, or the like). In this case, the TRP 1 transmits both a control signal (PDCCH) and a data signal (PDSCH) to the UE.

FIG. 1B shows an example of a case that only one TRP (the TRP 1 in this example) of the multi-TRP transmits the control signal to the UE, and the multi-TRP transmit the data signals (which may be referred to as a single master mode). The UE receives each of the PDSCHs transmitted from the multi-TRP based on one piece of downlink control information (DCI).

FIG. 1C shows an example of a case that each of the multi-TRP transmits a part of the control signals to the UE, and the multi-TRP transmits the data signals (which may be referred to as a master slave mode). The TRP 1 may transmits a part 1 of the control signal (DCI), and the TRP 2 may transmits a part 2 of the control signal (DCI). The part 2 of the control signal may depend on the part 1. The UE receives each of the PDSCHs transmitted from the multi-TRP based on these parts of the DCI.

FIG. 1D shows an example of a case that each of the multi-TRP transmits a different control signal to the UE, and the multi-TRP transmits the data signals (which may be referred to as a multi-master mode). The TRP 1 may transmit a first control signal (DCI), and the TRP 2 may transmit a second control signal (DCI). The UE receives each of the PDSCHs transmitted from the multi-TRP based on these pieces of DCI.

In the case, as shown in FIG. 1B, that a plurality of PDSCHs (which may be referred to as multi-PDSCH (multiple PDSCH)) from the multi-TRP are scheduled using one piece of DCI, the DCI may be referred to as single DCI (single PDCCH). In the case, as shown in FIG. 1D, that a plurality of PDSCHs from the multi-TRP are scheduled using a plurality of pieces of DCI, the plurality of pieces of DCI may be referred to as multi-DCI (multi-PDCCH (multiple PDCCH)).

Codewords (code word, CW) different from each other and layers different from each other may be transmitted from the respective TRPs of the multi-TRP. As one mode of multi-TRP transmission, non-coherent joint transmission (NCJT) is under study.

In the NCJT, for example, the TRP 1 modulates and maps a first codeword, and transmits a first PDSCH by using a first precoding of a first number of layers (for example, two layers) by layer mapping. The TRP 2 modulates and maps a second codeword, and transmits a second PDSCH by using a second precoding of a second number of layers (for example, two layers) by layer mapping.

Note that the plurality of PDSCHs (multi-PDSCH) transmitted by NCJT may be defined to overlap partially or fully in at least one of time and frequency domains. In other words, the first PDSCH from a first TRP and the second PDSCH from a second TRP may overlap in at least one of time and frequency resources.

These first and second PDSCHs may be assumed to be not in a quasi-co-location (QCL) relation (or to be not quasi-co-located). The reception of the multi-PDSCH may be interpreted as simultaneous reception of PDSCHs of not a certain QCL type (for example, QCL type D).

According to such a multi-TRP scenario, more flexible transmission control using a good quality channel is possible.

(PDCCH Allocation)

In Rel. 15 NR, a network (NW) ensures that no overbooking (excessive allocation) occurs for a common search space (CSS). The UE does not expect to be configured with CCS sets that result to the corresponding total number or number per scheduled cell of monitored PDCCH candidates and non-overlapped control channel elements (CCEs) per slot that exceed the corresponding maximum numbers per slot.

In Rel. 15 NR, the network (NW) ensures that no overbooking based on a case that carrier aggregation (CA) is not performed (non-CA) occurs for a secondary cell (SCell). For an identical cell scheduling or for cross-carrier scheduling in a case that the scheduling cell and the scheduled cell have a plurality of DL BWPs having an identical subcarrier spacing (SCS) configuration μ, the UE does not expect that the number of PDCCH candidates and the number of non-overlapped CCEs per slot on the SCell are larger than the corresponding numbers that the UE is capable of monitoring on the SCell per slot.

First, the PDCCH candidates for CSS are allocated, and thereafter, the PDCCH candidates for UE-specific search space (USS) are allocated in an ascending order of a search space set index.

The CSS has a priority higher than the USS.

All of the PDCCH candidates for a USS set having a lower SS set ID are mapped before the PDCCH candidates for a USS set having higher SS set ID. In a case that whole of the PDCCH candidates in a certain SS set cannot be mapped, the PDCCH candidates in the certain SS set and subsequent SS sets are dropped (are not mapped). In an SS set ID order, an SS set after a certain SS set may be referred to as a subsequent SS set.

In a case that a higher layer index is configured, for each CORESET, for the UE supporting a multi-PDCCH (multi-DCI)-based multi-TRP transmission, the UE may support the following principle for the maximum numbers of BDs and CCEs for multi-DCI-based multi-TRP transmission.

For the CORESET configured to an identical TRP (an identical higher layer index), the maximum number of monitored PDCCH candidates per slot in a DL BWP may not exceed a limitation in Rel. 15 $M_{PDCCH}^{max, slot, \mu}$, and the maximum number of non-overlapped CCEs may not exceed a limitation in Rel. 15 $C_{PDCCH}^{max, slot, \mu}$. The higher layer index may be configured for each PDCCH configuration information (PDCCH-Config), or for each CORESET. The higher layer index may correspond to the TRP.

FIG. 2 shows the maximum number $M_{PDCCH}^{max, slot, \mu}$ of monitored PDCCH candidates per slot for the DL BWP having a SCS configuration $\mu \in \{0, 1, 2, 3\}$ for a behavior using a single serving cell in Rel. 15. FIG. 3 shows the maximum number $C_{PDCCH}^{max, slot, \mu}$ of non-overlapped CCEs per slot for the DL BWP having the SCS configuration $\lambda \in \{0, 1, 2, 3\}$ for the behavior using a single serving cell in Rel. 15. In a case that the CCEs for PDCCH candidates correspond to different CORESET indexes, or first different symbols for receiving the PDCCH candidates, those CCEs do not overlap.

In a case that $\Sigma_{\mu=0}^{3} N_{cells}^{DL, \mu} \leq N_{cells}^{cap}$, and the UE is configured with $N_{cells}^{DL, \mu}$ DL cells having the DL BWP having the SCS configuration μ, the UE is not required to monitor the PDCCH candidates the number of which is more than $M_{PDCCH}^{total, slot, \mu} = M_{PDCCH}^{max, slot, \mu}$, or the non-overlapped CCEs the number of which is more than $C_{PDCCH}^{total, slot, \mu} = C_{PDCCH}^{max, slot, \mu}$ per slot for each scheduled cell in the scheduling cell on an active DL BWP. $N_{cells}^{cap}$ may be a value of capability information (pdcch-BlindDetectionCA) the UE provides, or the configured number of DL cells.

Whether and how PDCCH overbooking for the CORESET associated with an identical TRP (higher layer index) is supported for the CSS is not clear.

Whether and how PDCCH overbooking for the CORESET associated with the an identical TRP (higher layer index) is supported for the SCell not clear.

How a PDCCH mapping or dropping rule is defined for a DL serving cell configured with multi-PDCCH-based multi-TRP transmission is not clear.

In view of these, the inventors of the present invention came up with a PDCCH allocation method in the multi-PDCCH-based multi-TRP transmission.

Hereinafter, embodiments according to the present disclosure will be described in detail with reference to the drawings. The radio communication methods according to the embodiments may be employed independently or may be employed in combination.

Note that, in the present embodiment, a panel, an Uplink (UL) transmission entity, a TRP, a spatial relation, a control resource set (CORESET), a PDSCH, a codeword, a base station, a certain antenna port (for example, a demodulation reference signal (DMRS) port), a certain antenna port group (for example, a DMRS port group), a certain group (for example, code division multiplexing (CDM) group, a certain reference signal group, a CORESET group), and the like may be interchangeably interpreted. A panel Identifier (ID) and a panel may be interchangeably interpreted. A higher layer index, a TRP ID, a TRP, and an index may be interchangeably interpreted. An index and an ID may be interchangeably interpreted.

In the present disclosure, the number of monitored PDCCH candidates and the number of blind decodes (blind detections (BDs)) may be interchangeably interpreted. The number of non-overlapped CCEs, the number of channel estimation CCEs, the number of CCEs may be interchangeably interpreted.

In the present disclosure, a limitation, an upper limit, a limit, a restriction, and a maximum number may be interchangeably interpreted.

In the present disclosure, allocation and mapping may be interchangeably interpreted.

(Radio Communication Method)

Limitations per TRP may be defined on the maximum number of monitored PDCCH candidates and the maximum number of non-overlapped CCEs. The limitations per TRP may mean the maximum numbers of monitored PDCCH candidates and non-overlapped CCEs per slot with respect to the DL BWP for the CORESET configured for an identical TRP.

A limitation for a non-CA (single serving cell) similar to Rel. 15 NR (for example, FIG. 2 and FIG. 3 described above) may be used on the maximum number of monitored PDCCH candidates and the maximum number of non-overlapped CCEs. The limitation for the non-CA and the limitation in Rel. 15 NR may be interchangeably interpreted.

In the present disclosure, the limitation per TRP being met for a certain TRP may be at least one of a limitation on the number of BDs per TRP and a limitation on the number of CCEs per TRP being met for the TRP. The limitation per TRP being not met for a certain TRP may be neither the limitation on the number of BDs per TRP nor the limitation on the number of CCEs per TRP being met for the TRP.

In the present disclosure, the limitation for the non-CA being met may be at least one of the limitation for the non-CA on the number of BDs and the limitation for the non-CA on the number of CCEs being met. The limitation for the non-CA being not met may be neither the limitation for the non-CA on the number of BDs nor the limitation for the non-CA on the number of CCEs being met.

An SS set after a certain SS set in an order based on a mapping rule (at least one of the SS set ID order, a mapping rule for CSS described later, and a mapping rule for USS described later) may be referred to as a subsequent SS set.

Embodiment 1

A PDCCH mapping rule for the PDCCH candidates for CSS may be defined for a DL serving cell configured with multi-PDCCH-based multi-TRP transmission.

Embodiment 1-1

The NW may ensure that no PDCCH overbooking based on the limitation per TRP occurs for the CSS on a higher priority basis than the limitation in Rel. 15.

The UE may not expect to be configured with CCS sets that result to the corresponding total number or number per scheduled cell or number per TRP of monitored PDCCH candidates and non-overlapped CCEs per slot that exceed the corresponding maximum numbers per slot.

The UE may allocate the PDCCH candidates to a plurality of CSS sets configured based on the maximum numbers of monitored PDCCH candidates and non-overlapped CCEs per slot per TRP to monitor the allocated PDCCH candidates. Each of the plurality of CSS sets may correspond to any of a plurality of TRPs. The total number, the number per scheduled cell, and the number per TRP of monitored PDCCH candidates and non-overlapped CCEs per slot may not exceed corresponding maximum numbers.

According to Embodiment 1-1, the NW can always ensure that no PDCCH overbooking of a certain TRP occurs for the CSS, and the multi-TRP transmission can be ensured by the network configuration.

Embodiment 1-2

The PDCCH overbooking based on the limitation per TRP may be permitted for the CSS. In this case, a UE behavior of how to map the PDCCH candidates to the CSS may be defined according to Embodiment 2.

The UE may allocate a plurality of PDCCH candidates to at least one of a plurality of CSS sets based on the maximum numbers of monitored PDCCH candidates and non-overlapped CCEs per slot per TRP to monitor the plurality of allocated PDCCH candidates.

Embodiment 2

A PDCCH mapping rule for the PDCCH candidates for CSS set may be defined for a DL serving cell configured with multi-PDCCH-based multi-TRP transmission.
<<Mapping Rule for CSS>>

The UE may allocate all of the PDCCH candidates for a certain SS set in accordance with at least one of orders of the SS set ID, the higher layer index, and a sequentially different TRP selection for a plurality of SS sets.

The PDCCH mapping may be defined based on at least one of the following mapping rules (or orders) 1 to 3 for CSS. The UE and the NW may map the PDCCH candidates based on this rule.
[Mapping Rule 1 for CSS]

The UE may map all of the PDCCH candidates for a CSS set having a lower SS set ID before the PDCCH candidates for a CSS set having a higher SS set ID.
[Mapping Rule 2 for CSS]

The UE may first map all of the PDCCH candidates for a CSS set for a CORESET configured to the first higher layer index, and thereafter, may map all of the PDCCH candidates for a CSS set for the CORESET configured to the second higher layer index.

For the CORESET configured to an identical higher layer index, the UE may map all of the PDCCH candidates for a CSS set having a lower SS set ID before the PDCCH candidates for a CSS set having a higher SS set ID, based on the limitation per TRP.

[Mapping Rule 3 for CSS]

The UE may map all of the PDCCH candidates for CSS sets for a plurality of CORESETs configured to the different higher layer indexes in an interleave form over a plurality of TRPs.

For the CORESET configured to an identical higher layer index, the UE may map all of the PDCCH candidates for a CSS set having a lower SS set ID before the PDCCH candidates for a CSS set having a higher SS set ID, based on the limitation per TRP. Once the UE maps all of the PDCCH candidates for one CSS set associated with a certain higher layer index, the UE may map all of the PDCCH candidates for one CSS set associated with a different higher layer index. The UE may repeatedly select the higher layer index in an ascending or descending order of the higher layer index.

FIG. 4 is a diagram to show an example of a CSS set configuration. In this example, CORESETs #0 and #1 are configured for TRP #1. CSS set #1 is configured for CORESET #0 and CSS sets #4 and #6 are configured for CORESET #1. CORESET #2 is configured for TRP #2. CSS sets #2 and #3 are configured for CORESET #2.

The UE maps the PDCCH candidates in an order of CSS sets #1, #2, #3, #4, and #6 in accordance with the mapping rule 1 for CSS.

The UE maps the PDCCH candidates in an order of CSS sets #1, #4, #6, #2, and #3 in accordance with the mapping rule 2 for CSS.

The UE maps the PDCCH candidates in an order of CSS sets #1, #2, #4, #3, and #6 in accordance with the mapping rule 3 for CSS.

According to the above mapping rules for. CSS, flexibility for the NW (for example, gNB) in scheduling can be heightened.

<<Dropping Rule for CSS>>

The PDCCH candidate may be dropped for a CSS set based on one of the following dropping rules 1 and 2.

[Dropping Rule 1 for CSS]

In a case that whole of the PDCCH candidates in a certain CSS set cannot be mapped, the PDCCH candidates in the certain CSS set and subsequent SS sets (which may be CSS sets or USS sets) may be dropped (may not be mapped).

In FIG. 5, Case 0 is a case that the limitation per TRP is met on neither TRP #1 nor #2, and the limitation for the non-CA is not met.

Case 1 is a case that the limitation per IRS is met on neither IRS #1 nor #2, and the limitation for the non-CA is met. Case 2 is a case that the limitation per TRP is not met on TRP #1, the limitation per TRP is met on TRP #2, and the limitation for the non-CA is met. Case 3 is a case that the limitation per TRP is met on TRP #1, the limitation per TRP is not met on TRP #2, and the imitation for the non-CA is met.

Case 4 is a case that the limitation per TRP is not met on TRP #1, the limitation per TRP is met on TRP #2, and the limitation for the non-CA is not met Case 5 is a case that the limitation per TRP is met on TRP #1, the limitation per TRP is not met on TRP #2, and the limitation for the non-CA is not met. Case 6 is a case that the limitation per TRP is met on both TRPs #1 and #2, and the limitation for the non-CA is not met.

Case 7 is a case that the limitation per TRP is met on both TRPs #1 and #2, and the limitation for the non-CA is met.

In the case (Case 0) that the limitation per TRP is met on neither TRP #1 nor #2, and the limitation for the non-CA is not met, the PDCCH overbooking may not be performed. In the case (any of Cases 1 to 7) that at least one of the limitation per TRP on at least one TRP and the limitation for the non-CA is met, in a case that whole of the PDCCH candidates in a certain CSS set cannot be mapped, the PDCCH candidates in the certain CSS set and subsequent SS sets may be dropped (may not be mapped). The PDCCH mapping order in this case may be one of the mapping rules 1 to 3 for CSS described above.

[Dropping Rule 2 for CSS]

In a case that whole of the PDCCH candidates in a certain CSS set cannot be mapped based on the limitation per TRP, the PDCCH candidates in the certain CSS set and subsequent SS sets (which may be CSS sets or USS) associated with the CORESET configured to an identical higher layer index may be dropped (may not be mapped). In a case that whole of the PDCCH candidates in a certain CSS set cannot be mapped based on the limitation for the non-CA, the PDCCH candidates in the certain CSS set and subsequent SS sets (which may be CSS sets or USS sets) may be dropped (may not be mapped).

Cases 0 to 7 in FIG. 6 are similar to those in FIG. 5 described above.

In Case 0, the PDCCH overbooking may not be performed.

In the case (any of Cases 1 to 3) that the limitation for the non-CA is met and the limitation per TRP is not met on at least one TAP, in a case that whole of the PDCCH candidates in a certain CSS set (SS set of interest) cannot be mapped, the PDCCH candidates in the certain CSS set and subsequent SS sets may be dropped (may not be mapped).

In the case (any of Cases 4 to 6) that the limitation for the non-CA is not met and the limitation per TRP is met on at least one TRP, in a case that whole of the PDCCH candidates in a CSS set associated with a CORESET configured to a certain higher layer index cannot be mapped, the PDCCH candidates in the CSS set and subsequent SS sets associated with the CORESET configured to an identical higher layer index may be dropped (may not be mapped).

In Case 4, the PDCCH candidates are mapped in accordance with the mapping rule 1 for CSS or the mapping rule 3 for CSS, and in a case that whole of the PDCCH candidates in a CSS set associated with a CORESET configured to a certain higher layer index cannot be mapped, the CSS set and all subsequent SS sets associated with TRP #2 may be dropped. In Case 4, the PDCCH candidates are mapped in accordance with the mapping rule 2 for CSS, and in a case that whole of the PDCCH candidates in a CSS set associated with a CORESET configured to a certain higher layer index cannot be mapped, the CSS set and all subsequent SS sets may be dropped.

In Case 5, in a case that whole of the PDCCH candidates in a CSS set associated with a CORESET configured to a certain higher layer index cannot be mapped, the mapping rules 1 to 3 for CSS may drop the CSS set and all subsequent SS sets associated with TRP #1.

In the case (Case 7) that the limitation for the non-CA is met and the limitation per TRP is met on at least one TRP, in a case that whole of the PDCCH candidates in a certain CSS set cannot be mapped, the PDCCH candidates in the certain CSS set and subsequent SS sets may be dropped (may not be mapped).

According to Embodiment 2 described above, the PDCCH candidates for the CSS set can be appropriately mapped.

Embodiment 3

A PDCCH mapping rule for the PDCCH candidates for SCell may be defined for a DL serving cell configured with multi-PDCCH-based multi-TRP transmission.

Embodiment 3-1

The NW may ensure that no PDCCH overbooking based on the limitation per TRP occurs for the SCell.

For the CORESET configured with an identical higher layer index that is configured for each piece of PDCCH configuration information (PDCCH-Config) and for each CORESET (the CORESET having an identical value of the higher layer index that is configured for each piece of PDCCH configuration information and for each CORESET), for an identical cell scheduling or for cross-carrier scheduling in a case that the scheduling cell and the scheduled cell have a plurality of DL BWPs having an identical SCS configuration $\mu$, the UE does not expect that the number of PDCCH candidates and the number of non-overlapped CCEs per slot on the SCell are larger than the corresponding numbers (the limitation per TRP) that the UE is capable of monitoring on the SCell per slot.

The UE may allocate the PDCCH candidates to a plurality of SS sets configured based on the maximum numbers of monitored PDCCH candidates and non-overlapped CCEs per slot per TRP to monitor the allocated PDCCH candidates. The plurality of SS sets may be configured for the SCell. Each of the plurality of SS sets may correspond to any of a plurality of TRPs. For the CORESET having an identical value of the higher layer index that is configured for each piece of PDCCH configuration information and for each CORESET, for an identical cell scheduling or for cross-carrier scheduling in a case that the scheduling cell and the scheduled cell have a plurality of DL BWPs having an identical SCS configuration $\mu$, the number of PDCCH candidates and the number of non-overlapped CCEs per slot on the SCell may not exceed the corresponding maximum numbers.

According to Embodiment 3-1, the NW can always ensure that no PDCCH overbooking of a certain TRP occurs for the SCell, and the multi-TRP transmission can be ensured by the network configuration.

Embodiment 3-2

The PDCCH overbooking based on the limitation per TRP may be permitted for the SCell. In this case, a UE behavior of how to map the PDCCH candidates to the SCell may be defined according to Embodiment 4.

The UE may allocate a plurality of PDCCH candidates to at least one of a plurality of SS sets based on the maximum numbers of monitored PDCCH candidates and non-overlapped CCEs per slot per TRP to monitor the plurality of allocated PDCCH candidates. Each of the plurality of SS sets may correspond to any of a plurality of TRPS. The plurality of SS sets may be configured for the secondary cell.

Embodiment 4

A PDCCH mapping rule for all of the PDCCH candidates may be defined for a DL serving cell configured with multi-PDCCH-based multi-TRP transmission.

Embodiment 4 may be applied only to the primary cell (PCell), only to the SCell, or to both the PCell and the SCell.

<<Mapping Rule for USS>>

For search space sets having different search space types, the CSS set may be mapped before the USS set.

The PDCCH mapping for the CSS set may be defined based on Embodiment 2.

The PDCCH mapping may be defined for the USS set based on at least one of the following mapping rules (or orders) 1 to 3 for USS. The UE and the NW may map the PDCCH candidates based on this role.

[Mapping Rule 1 for USS]

The UE may map all of the PDCCH candidates for a USS set having a lower SS set ID before the PDCCH candidates for a CSS set having a higher SS set ID.

[Mapping Rule 2 for USS]

The UE first may map all of the PDCCH candidates for a USS set for a CORESET configured to the first higher layer index, and thereafter, may map all of the PDCCH candidates for a USS set for the CORESET configured to the second higher layer index.

For the CORESET configured to an identical higher layer index, the UE may map all of the PDCCH candidates for a USS set having a lower SS set ID before the PDCCH candidates for a USS set having a higher SS set ID, based on the limitation per TRP.

[Mapping Rule 3 for USS]

The UE may map all of the PDCCH candidates for USS sets for a plurality of CORESETs configured to the different higher layer indexes in an interleave form over a plurality of TRPs.

For the CORESET configured to an identical higher layer index, the UE may map all of the PDCCH candidates for a USS set having a lower SS set ID before the PDCCH candidates for a USS set having a higher SS set ID, based on the limitation per TRP. Once the UE maps all of the PDCCH candidates for one USS set associated with a certain higher layer index, the UE may map all of the PDCCH candidates for one USS set associated with a different higher layer index. The UE may repeatedly select the higher layer index in an ascending or descending order of the higher layer index.

Figure 7:
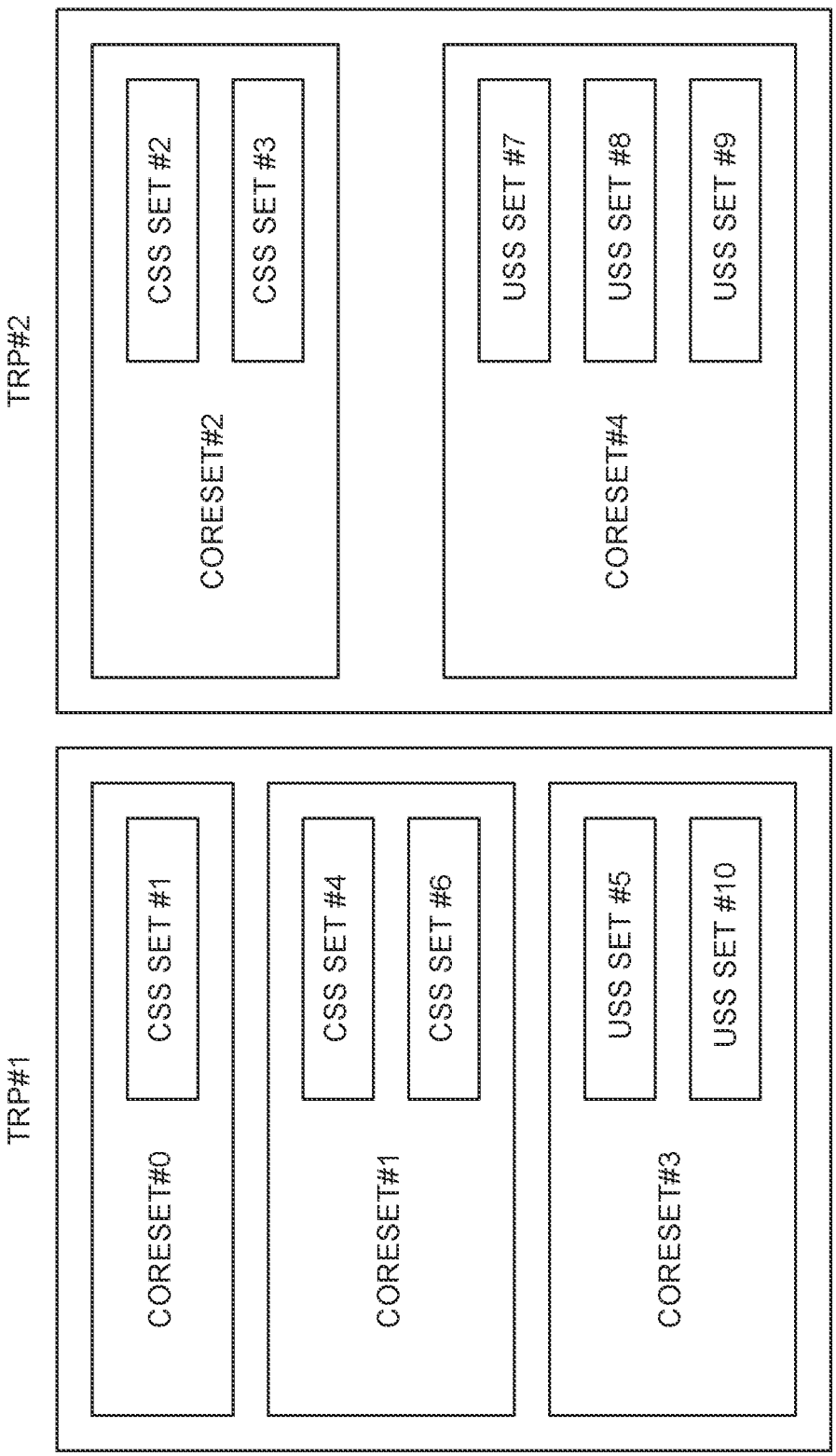
FIG. 7 is a diagram to show an example of an SS set configuration.

FIG. 7 is a diagram to show an example of an SS set configuration. In this example, CORESETs #0, #1, and #3 are configured for TRP #1. CSS set #1 is configured for CORESET #0, CSS sets #4 and #6 are configured for CORESET #1, and USS sets #5 and #10 are configured for CORESET #3. CORESETs #2 and #4 are configured for TRP #2. CSS sets #2 and #3 are configured for CORESET #2. USS sets #7, #8, and #9 are configured doe CORESET #4.

In a case that Embodiment 1-1 is applied (the NW ensures that, no PDCCH overbooking based on the limitation per TRP occurs for the CSS), the PDCCH mapping may be performed in accordance with the following order.

All the CSS sets may be mapped in the SS set ID order.

The UE, after mapping the all CSS sets, maps the PDCCH candidates in an order of USS sets #5, #7, #8, #9, and #10 in accordance with the mapping rule 1 for USS.

The UE, after mapping the all CSS sets, maps the PDCCH candidates in an order of USS sets #5, #10, #7, #8, and #9 in accordance with the mapping rule 2 for USS.

The UE, after mapping the all CSS sets, maps the PDCCH candidates in an order of USS sets #5, #7, #10, #8, and #9 in accordance with the mapping rule 3 for USS.

In a case that Embodiment 1-2 is applied (the PDCCH overbooking based on the limitation per TRP is permitted for the CSS), the PDCCH mapping may performed in accordance with the following order.

The UE maps the PDCCH candidates in an order of CSS sets #1, #2, #3, #4, and #6 in accordance with the mapping rule 1 for CSS, and thereafter, maps the PDCCH candidates in an order of USS sets #5, #7, #8, #9, and #10 in accordance with the mapping rule 1 for USS.

The UE maps the PDCCH candidates in an order of CSS sets #1, #4, #6, #2, and #3 in accordance with the mapping rule 2 for CSS, and thereafter, maps the PDCCH candidates in an order of USS sets #5, #10, #7, #8, and #9 in accordance with the mapping rule 2 for USS.

The UE maps the PDCCH candidates in an order of CSS sets #1 #2, #4, #3, and #6 in accordance with the mapping rule 3 for CSS, and thereafter, maps the PDCCH candidates in an order of USS sets #5, #7, #10, #8, and #9 in accordance with the mapping rule 3 for USS.

According to the above mapping rules for USS, flexibility for the NW (for example, gNB) in scheduling can be heightened.

<<Dropping Rule>>

The PDCCH candidate may be dropped for an SS set based on one of the following dropping rules 1 and 2.

[Dropping Rule 1]

In a case that whole of the PDCCH candidates in a certain SS set cannot be mapped, the PDCCH candidates in the certain SS set and subsequent SS sets may be dropped (may not be mapped).

Cases 0 to 7 in FIG. 8 are similar to those in FIG. 5 described above.

In the case (Case 0) that the limitation per TRP is met on neither TRP #1 nor #2, and the limitation for the non-CA is not met, the PDCCH overbooking may not be performed. In the case (any of Cases 1 to 7) that at least one of the limitation per TRP on at least one TRP and the limitation for the non-CA is met, in a case that whole of the PDCCH candidates in a certain SS set cannot be mapped, the PDCCH candidates in the certain SS set and subsequent SS sets may be dropped (may not be mapped). The PDCCH mapping order for the USS set in this case may be one of the mapping rules 1 to 3 for USS described above.

[Dropping Rule 2]

In a case that whole of the PDCCH candidates in a certain SS set cannot be mapped based on the limitation per TSP, the PDCCH candidates in the certain SS set and subsequent SS sets associated with the CORESET configured to an identical higher layer index may be dropped (may not be mapped). In a case that whole of the PDCCH candidates in a certain SS set cannot be mapped based on the limitation for the non-CA, the PDCCH candidates in the certain SS set and subsequent SS sets may be dropped (may not mapped).

Cases 0 to 7 in FIG. 9 are similar to those in FIG. 5 described above.

In the case (Case 0) that the limitation per TRP is met on neither TRP #1 nor #2, and the limitation for the non-CA is not met, the PDCCH overbooking may not be performed.

In the case (any of Cases 1 to 3) that the limitation for the non-CA is met and the limitation per TRP is not met on at least one TRP, in a case that whole of the PDCCH candidates in a certain SS set (SS set of interest) cannot be mapped, the PDCCH candidates in the certain SS set and subsequent SS sets may be dropped (may not be mapped).

In the case (any of Cases 4 to 6) that the limitation for the non-CA is not met and the limitation per TRP is met on at least one TRP, in a case that whole of the PDCCH candidates in an SS set associated with a CORESET configured to a certain higher layer index cannot be mapped, the PDCCH candidates in the SS set and subsequent SS sets associated with the CORESET configured to an identical higher layer index may be dropped (may not be mapped).

In Case 4, the PDCCH candidates are mapped in accordance with the mapping rule 1 for USS or the mapping rule 3 for USS, and in a case that whole of the PDCCH candidates in an SS set associated with a CORESET configured to a certain higher layer index cannot be mapped, the SS set and all subsequent SS sets associated with TRP #2 may be dropped. In Case the PDCCH candidates are mapped in accordance with the mapping rule 2 for USS, and in a case that whole of the PDCCH candidates in an SS set associated with a CORESET configured to a certain higher layer index cannot be mapped, the SS set and all subsequent SS sets may be dropped.

In Case 5, in a case that whole of the PDCCH candidates in an SS set associated with a CORESET configured to a certain higher layer index cannot be mapped, the mapping rules 1 to 3 for USS may drop the SS set and all subsequent SS sets associated with TRP #1.

In the case (Case 7) that the limitation for the non-CA is met and the limitation per TRP is met on at least one TRP, in a case that whole of the PDCCH candidates in a certain SS set cannot be mapped, the PDCCH candidates in the certain SS set and subsequent SS sets may be dropped (may not be mapped).

According to Embodiment 4 described above, the PDCCH candidates for the SS set can be appropriately mapped.

Other Embodiments

The PDCCH configuration information (PDCCH-Config) may include a list (ControlResourceSetAddModList) of CORESET configuration information (CortrolResourceSet). This list may include 1 to 5 CORESET configuration information. The CORESET configuration information may include a CORESET ID (ControlResourceSetId) and a higher layer index.

In terms of the higher layer (RRC) parameter, a higher layer parameter for distinguishing the TRP (higher layer index) may or may not be introduced. A serving cell object (ServingCell) may be reused as a parameter for the higher layer index. In this case, the higher layer index or the additional parameter for a CORESET group may not be introduced. The higher layer index for distinguishing the IRS may mean some parameters for distinguishing serving cell object (for example, cell index (ServingCellId), or reference signal (RS) port index, and the like).

(Radio Communication System)

Hereinafter, a structure of a radio communication system according to one embodiment of the present disclosure will be described. In this radio communication system, any of the radio communication methods according to each embodiment of the present disclosure described above may be used alone or may be used in combination for communication.

Figure 10:
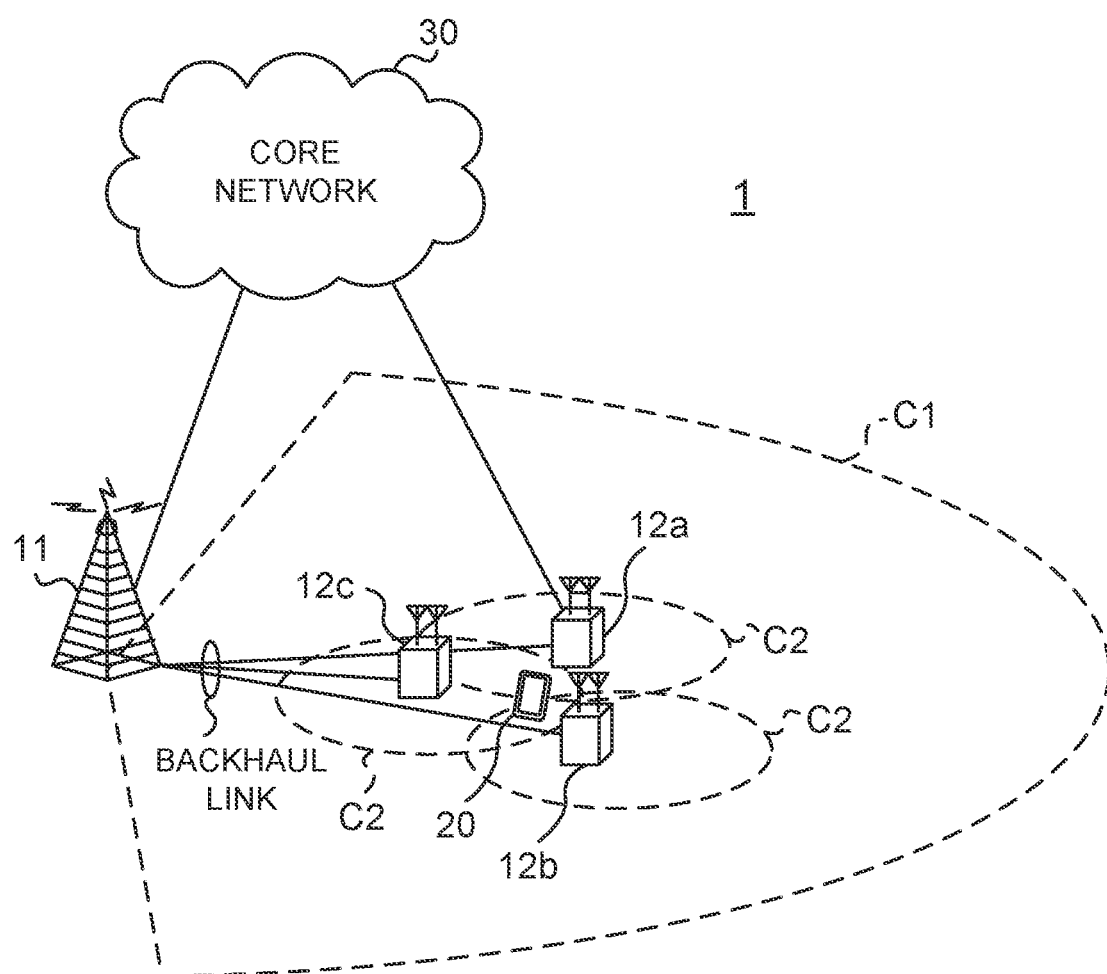
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eND) of LTE (E-UTRA) is a master node (MN), and a base station (gNB) of NR is a secondary node (SN). In NE-DC, a base station (gMB) of NR is an MN, and a base station (eNB) of LTE (E-UTRA) is an SN.

The radio communication system 1 may support dual connectivity between a plurality of base stations in the same RAT (for example, dual connectivity (NR-NR. Dual Connectivity (NM-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated. Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so o-on.

In the radio communication system 1, an orthogonal frequency division multiplexing (OFDM)-based wireless access scheme may be used. For example, in at least one of the downlink (DL) and the uplink (UI), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBS) and so on are communicated on the PDSCH. User data, higher layer control information and so on may be communicated on the PUSCH. The Master information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set" Note that a "search space," a "search space set," a "search space configuration," a "search space set configuration," a "CORESET," a "CORESET configuration" and so on of the present disclosure may interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system. 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
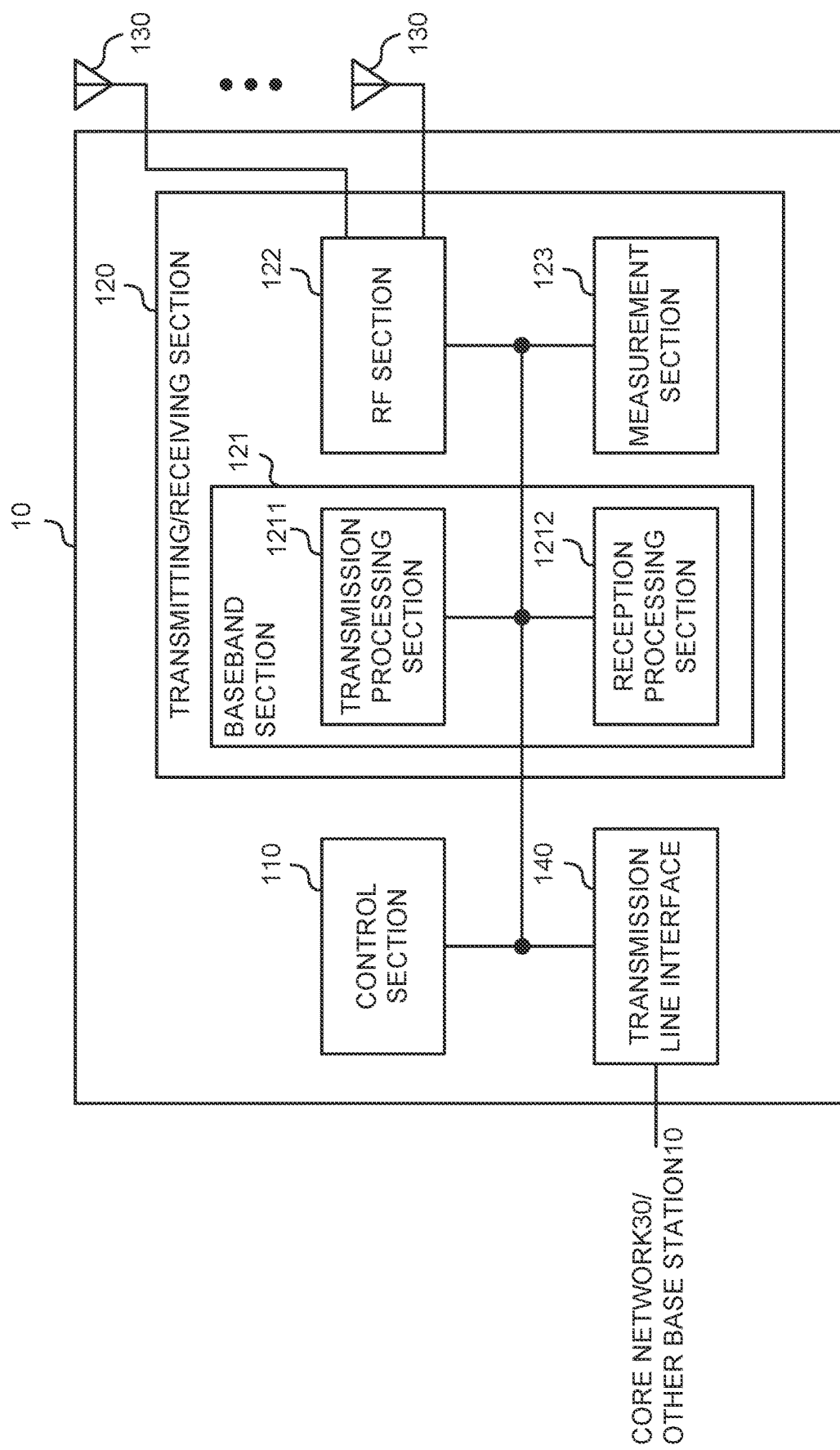
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can include a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium. Access Control (MAC) layer (for example, HARO retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform. (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the control section 120 may transmit the downlink control information (DCI) for scheduling a downlink shared channel (Physical Downlink Shared Channel (PDSCH)) to the user terminal 20.

(User Terminal)

Figure 12:
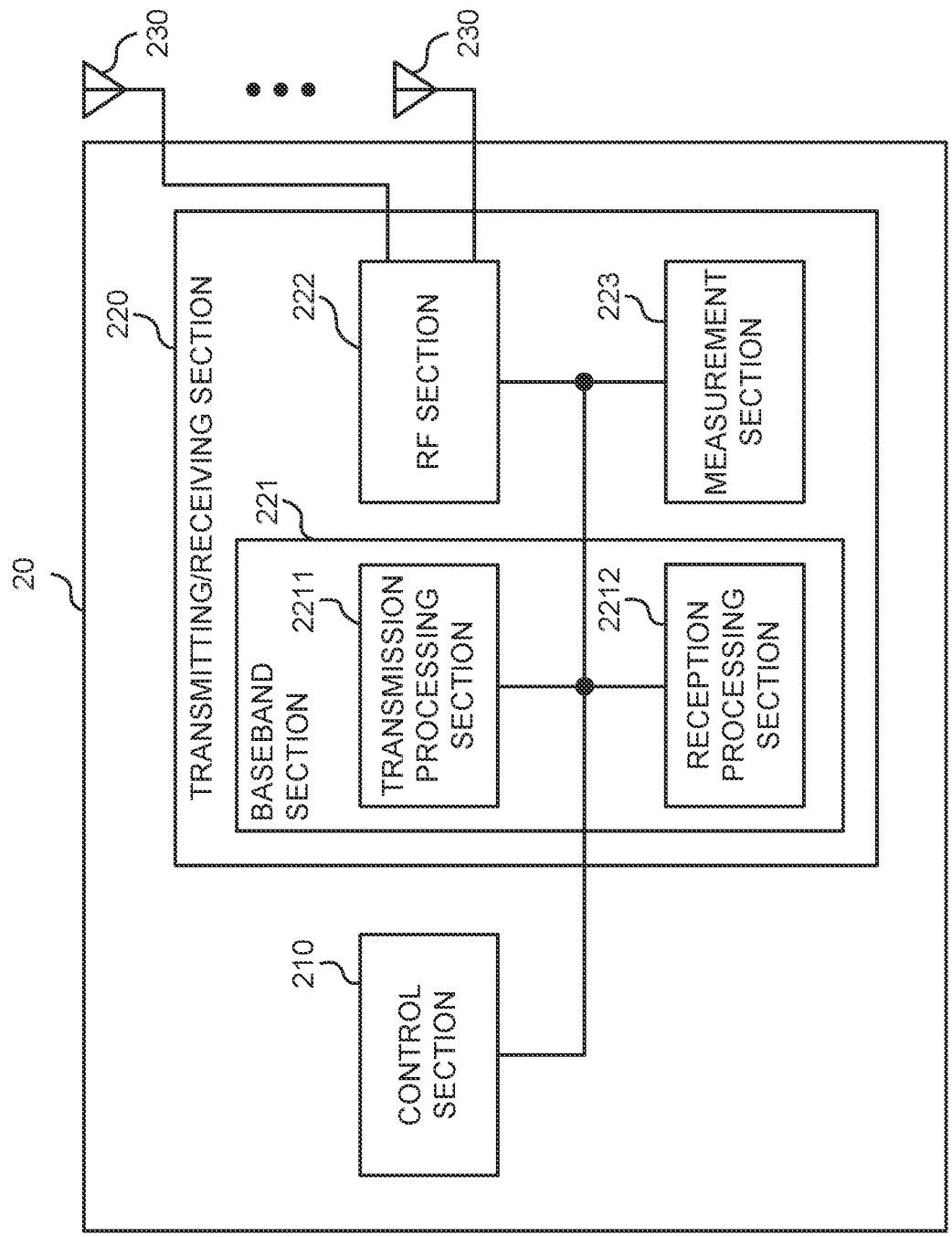
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts or the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may include a transmitting section and a receiving section. The transmitting section may include the transmission processing section 2211, and the RF section 222. The receiving section may include the reception processing section 2212, the RF section 222, and the measurement section 223.

The transmitting/receiving antennas 230 can include antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the PLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RPM measurement, CSI measurement, and so on, based on the received signal. The measurement section 223 may measure a received power (for example, RSRP), a received quality (for example, RSRQ, SINR, SNR), signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may allocate the PDCCH candidates to a plurality of search space (SS) sets configured based on the maximum numbers of monitored physical downlink control channel (PDCCH) candidates and non-overlapped control channel elements (CCEs) per slot per transmission/reception point. The transmitting/receiving section 220 may monitor the allocated PDCCH candidates. Each of the plurality of SS sets may correspond to any of a plurality of transmission/reception points.

Each of the plurality of SS sets may be a common SS set.

The total number, the number per scheduled cell, and the number per transmission/reception point of monitored PDCCH candidates and non-overlapped CCEs per slot may not exceed corresponding maximum numbers.

The plurality of SS sets may be configured for the secondary cell.

For a control resource set (CORESET) having an identical value of an index that is configured for each piece of PDCCH information and for each CORESET, for an identical cell scheduling or for cross-carrier scheduling in a case that a scheduling cell and a scheduled cell have a plurality of downlink bandwidth parts (BWPs) having an identical subcarrier spacing (SCS) configuration, the number of PDCCH candidates and the number of non-overlapped CCEs per slot on the secondary cell may not exceed corresponding maximum numbers.

The control section 210 may allocate a plurality of PDCCH candidates to at least one of a plurality of search space (SS) sets, based on the maximum numbers of monitored physical downlink control channel (PDCCH) candidates and non-overlapped control channel elements (CCEs) per slot per transmission/reception point. The transmitting/receiving section 220 may monitor the plurality of allocated PDCCH candidates. Each of the plurality of SS sets may correspond to any of a plurality of transmission/reception points.

The control section 210 may allocate all of the PDCCH candidates for a certain SS set in accordance with at least one of orders of a search space set ID, an index corresponding to a transmission/reception point, and a sequentially different transmission/reception point selection for a plurality of SS sets.

In a case that whole of the PDCCH candidates in one SS set of the plurality of SS sets is not possible to be allocated, the control section 210 may allocate the PDCCH candidates of subsequent search space sets after the one SS set in the order.

In a case that whole of the PDCCH candidates in one SS set of the plurality of SS sets is not possible to be allocated based on the maximum numbers per transmission/reception point, the control section 210 may allocate the PDCCH candidates of subsequent search space sets after the one SS set, in the order, the search space set being associated with a control resource set (CORESET) configured to an identical transmission/reception point.

The plurality of SS sets may be the common SS set or SS sets configured for the secondary cell.

(Hardware Structure)

Note that the block diagrams that have been used to describe the above embodiments show blocks in functional units. These functional blocks (components) may be implemented in arbitrary combinations of at least one or hardware and software. Also, the method for implementing each functional block is not particularly limited. That is, each functional block may be realized by one piece of apparatus that physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality or apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
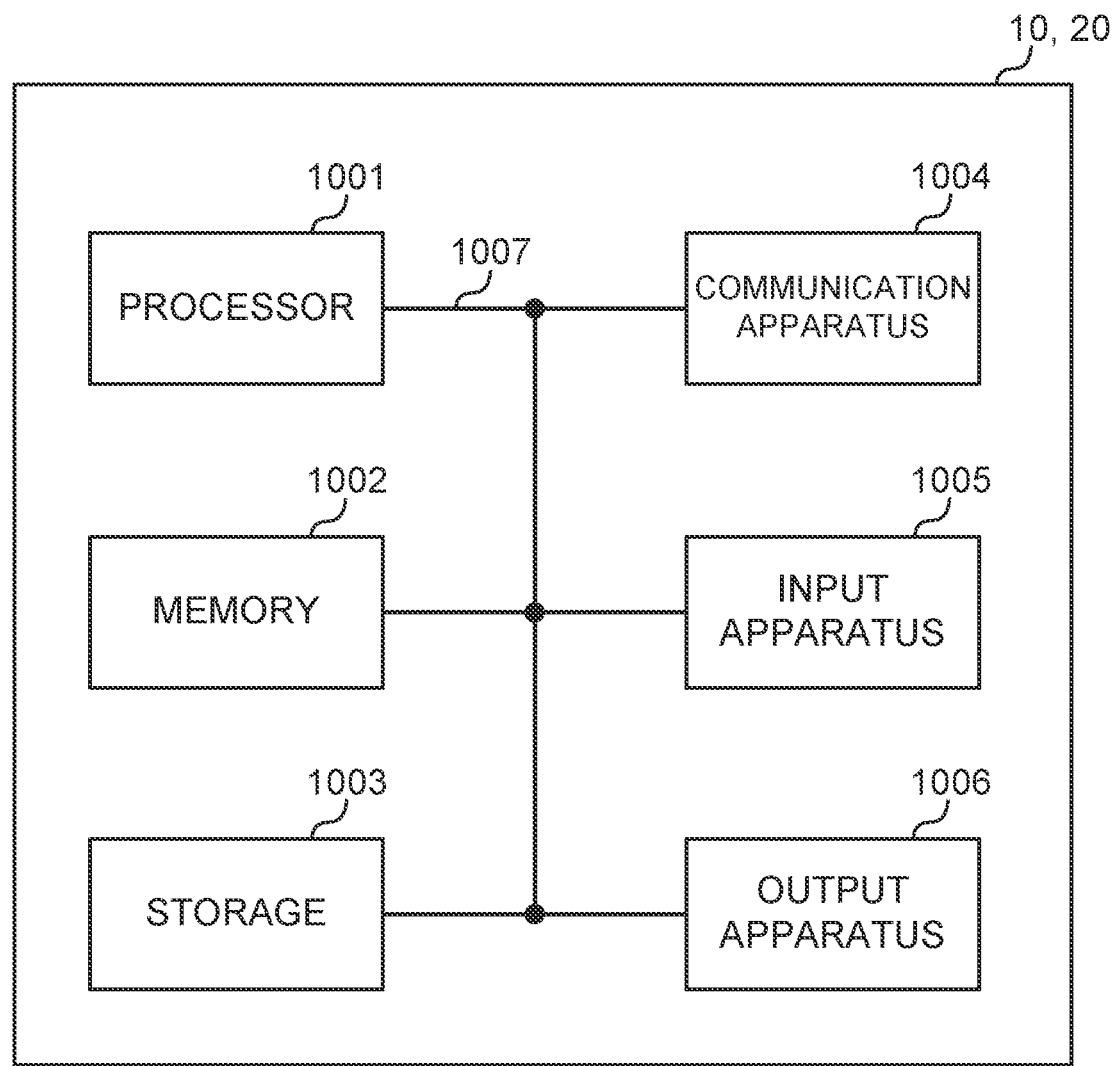
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110, the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that, vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain A mini-slot may be referred to as a "sub-slot" A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a ITT may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL) One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number or mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety or different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (RIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pica cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus", a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each as of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system. (4G), 5th generation mobile communication system. (5G), Future Radio Access (FRA), New-Radio Access Technology (RAT), New Radio (NR), New radio access (NX), Future generation radio access (FR), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different"

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that allocates physical downlink control channel (PDCCH) candidates of a UE-specific search space set having a lower search space set index before PDCCH candidates of a UE-specific search space set having a higher search space set index, based on a limit per first control resource set (CORESET) group, for the first CORESET group configured for a higher layer index of two higher layer indices configured for multiple CORESETs, and wherein a common search space set exceeding the limit per the first CORESET group is not configured for the first CORESET group; and
    a receiver that monitors the allocated PDCCH candidates.

2. The terminal according to claim 1, wherein the limit per the first CORESET group corresponds to at least one of a maximum number of monitored PDCCH candidates per slot and a maximum number of non-overlapped control channel elements (CCEs) per slot.

3. The terminal according to claim 1, wherein the receiver receives multiple physical downlink shared channels (PDSCHs) respectively scheduled by multiple downlink control information included in multiple PDCCHs detected based on the monitored PDCCH candidates.

4. A radio communication method for a terminal, comprising:
    allocating physical downlink control channel (PDCCH) candidates of a UE-specific search space set having a lower search space set index before PDCCH candidates of a UE-specific search space set having a higher search space set index, based on a limit per first control resource set (CORESET) group, for the first CORESET group configured for a higher layer index of two higher layer indices configured for multiple CORESETs, and wherein a common search space set exceeding the limit per the first CORESET group is not configured for the first CORESET group; and
    monitoring the allocated PDCCH candidates.

5. A system comprising a terminal and a base station, wherein
    the terminal comprises:
        a processor that allocates physical downlink control channel (PDCCH) candidates of UE-specific search space set having a lower search space set index before PDCCH candidates of a UE-specific search space set having a higher search space set index, based on a limit per first control resource set (CORESET) group, for the first CORESET group configured for a higher layer index of two higher layer indices configured for multiple CORESETs, and wherein a common search space set exceeding the limit per the first CORESET group is not configured for the first CORESET group; and a receiver that monitors the allocated PDCCH candidates, and the base station comprises:

a transmitter that transmits the PDCCH candidates.

\* \* \* \* \*